US012496390B2

(12) United States Patent
Cheng et al.

(10) Patent No.: US 12,496,390 B2
(45) Date of Patent: Dec. 16, 2025

(54) SPILL PROTECTION BASIN FOR SURGERIES

(71) Applicant: The Cleveland Clinic Foundation, Cleveland, OH (US)

(72) Inventors: Jianguo Cheng, Solon, OH (US); Sergey Samorezov, Highland Heights, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 119 days.

(21) Appl. No.: 17/587,529

(22) Filed: Jan. 28, 2022

(65) Prior Publication Data

US 2022/0387694 A1    Dec. 8, 2022

Related U.S. Application Data

(60) Provisional application No. 63/196,499, filed on Jun. 3, 2021.

(51) Int. Cl.
*A61M 1/00*     (2006.01)

(52) U.S. Cl.
CPC ..................................... *A61M 1/71* (2021.05)

(58) Field of Classification Search
CPC ............ A61M 1/69; A61M 1/71; A61H 35/00
USPC ......................................................... 604/317
See application file for complete search history.

(56) References Cited

U.S. PATENT DOCUMENTS

| | | | | |
|---|---|---|---|---|
| 2,305,289 A | * | 12/1942 | Coburg | A61B 90/40 128/850 |
| 5,127,411 A | * | 7/1992 | Schoolman | A61C 17/06 433/91 |
| 6,663,610 B1 | * | 12/2003 | Thompson | A61M 1/84 604/128 |
| D674,482 S | | 1/2013 | Wurapa | |
| 2001/0049511 A1 | * | 12/2001 | Coleman | A61H 9/00 604/290 |
| 2010/0004611 A1 | * | 1/2010 | Aali | A61F 13/05 602/53 |
| 2010/0130949 A1 | * | 5/2010 | Garcia | A61M 25/0017 604/326 |
| 2018/0353664 A1 | * | 12/2018 | Rioux | A61B 18/148 |

FOREIGN PATENT DOCUMENTS

WO    WO-2022076010 A1 *    4/2022

* cited by examiner

*Primary Examiner* — Andrew J Mensh
(74) *Attorney, Agent, or Firm* — Tucker Ellis LLP

(57) ABSTRACT

A spill protection basin for preventing spilling overflow fluid from a surgical site of a patient. The basin includes a perimeter wall defining an inner volume. A suction port is formed in the perimeter wall and adjacent to a bottom end thereof. The suction port is configured to permit drawing fluid from the inner volume when suction is applied thereto.

19 Claims, 15 Drawing Sheets

SPILL PROTECTION BASIN FOR SURGERIES

CROSS-REFERENCE TO RELATED APPLICATIONS

This application claims the benefit of U.S. provisional patent application No. 63/196,499 filed Jun. 3, 2021, which is incorporated herein by reference.

FIELD OF THE INVENTION

This application relates generally to providing spill protection for a surgical site of a patient. More specifically, it relates to a basin that can be used to minimize spills from the surgical site and to evacuate overflow irrigation or other fluid from the site. This application further relates to methods for preventing flooding and/or overflow of irrigation fluid at the surgical site, by way of the basin.

BACKGROUND OF THE INVENTION

Surgical irrigation is common in open surgeries to promote wound healing and to prevent infection. One common problem encountered during surgery is that an abundant amount of fluid (e.g., irrigation fluid, body fluid, etc.) at the surgical site often floods and overflows that surgical site. Such overflowed fluid spills over the patient, on the table and often onto the operators, ultimately ending up on the floor. It would be desirable to minimize or event prevent such overflow events during surgical procedures, so that contaminated fluid does not spill over the patient, or onto the operators or the floor.

BRIEF SUMMARY

In accordance with one aspect, there is provided a spill protection basin including a perimeter wall defining an inner volume. A suction port is formed in the perimeter wall adjacent to a bottom end thereof. The suction port is configured to permit drawing fluid from said inner volume when suction is applied thereto.

In accordance with another aspect, there is provided a method for preventing spilling overflow fluid from a surgical site of a patient, the method including positioning a basin so that a perimeter wall thereof surrounds the surgical site. The perimeter wall defines an inner volume and has a suction port formed therein at a bottom end thereof. The method further includes applying suction to draw fluid from said inner volume through said suction port.

In accordance with a further aspect, there is provided a spill protection basin including a perimeter wall defining an inner volume. A suction port is formed in the perimeter wall adjacent to a bottom end thereof. The suction port permits drawing fluid from said inner volume when suction is applied thereto. A first channel is in communication with the suction port and surrounds the bottom end of said perimeter wall. A second channel is disposed adjacent to said first channel and has an open bottom end configured to be closed by a surface surrounding the surgical site when the basin is positioned on that surface. A suction drawn against each of the first and second channels will be effective to draw fluid through the suction port into the first channel and to generate a vacuum within the second channel so as to secure the basin to the surface and form a seal therewith

DESCRIPTION OF EXAMPLE EMBODIMENTS

Figure 1:
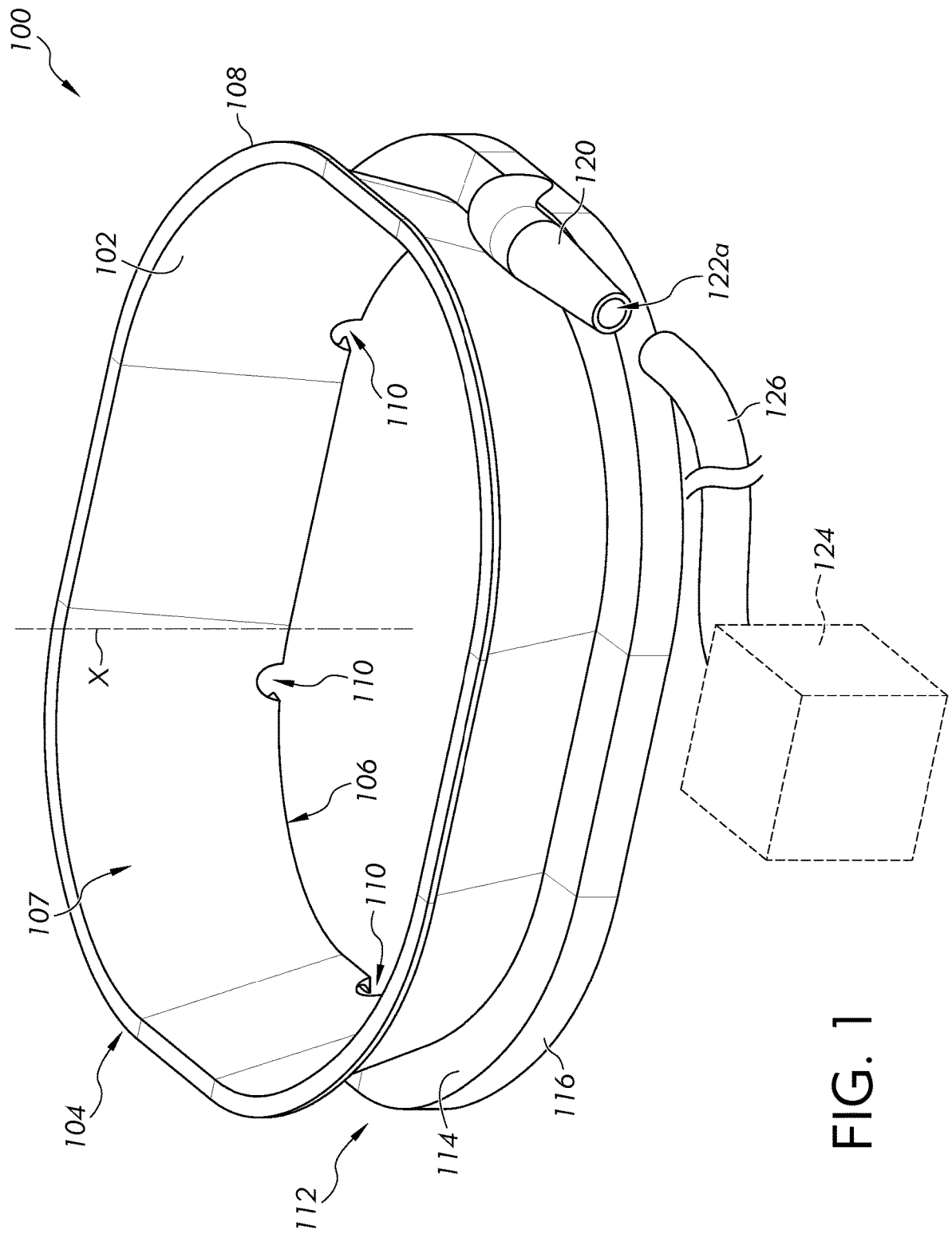
FIG. 1 is a top, perspective view of one embodiment of a spill protection basin.

Multiple embodiments of a spill protection basin are depicted in the drawings and discussed below. Unless otherwise mentioned, like reference numerals are used to designate similar or the same elements throughout the multiple embodiments discussed herein.

Referring first to the embodiment of FIG. 1, a spill protection basin 100 includes a perimeter wall 102 extending generally vertically with respect to a central axis 'X' between open, opposite top and bottom ends 104, 106 (i.e., first and second ends) thereof. The perimeter wall 102 may be inclined so as to define a substantially bowl-shaped wall as shown in the figure. Notably, the basin 100 can be manufactured of silicone or other flexible material, such as another synthetic or natural rubber, so that the basin 100 may be deflected to conform at its bottom end 106 to the patient's skin around the surgical site (i.e., the incision or open wound) in order to facilitate an appropriate seal against the passage of fluid. However, the basin 100 also may be constructed from a non-flexible material (e.g., rigid plastic, metal, etc.). In such cases, a flexible gasket can be provided at the bottom end 106 of the wall 102 in order to provide conformal shaping to the patient's skin in order to provide an appropriate seal therebetween around the surgical site.

The spill protection basin 100 is designed so that its perimeter wall 102 can rest against a patient's skin surrounding a surgical site (i.e. an incision or open wound) in order to bound and/or collect fluid (e.g., irrigation fluid, body fluid, etc.) from or delivered to the surgical site within an inner volume 107 defined between the wall 102 and the patient's skin. In this manner, the basin 100 minimizes spilling of fluid from the surgical site onto operators, as well as overflow of such fluid over the patient, onto the operating table and onto the floor.

In the illustrated embodiment, the wall 102 generally has an oval shape with flat side- and end-wall portions, which may be slanted to define a bowl-shape as noted above. However, the wall 102 is not confined to this configuration and may have any other geometric configuration (e.g., circular, rectangular, square, etc.). When slanted in a bowl-shape, the wall 102 flares radially outwards from the central axis 'X' in a direction from the bottom end 106 towards the top end 104. In this manner, the wall 102 is provided at an angle such that any fluid disposed on the wall 102 (e.g., via splashing, etc.) will flow downwards towards the bottom end 106. Further, the top end 104 of the wall 102 may include a peripheral flange 108 extending outwards therefrom (i.e., away from the central axis 'X').

Figure 2:
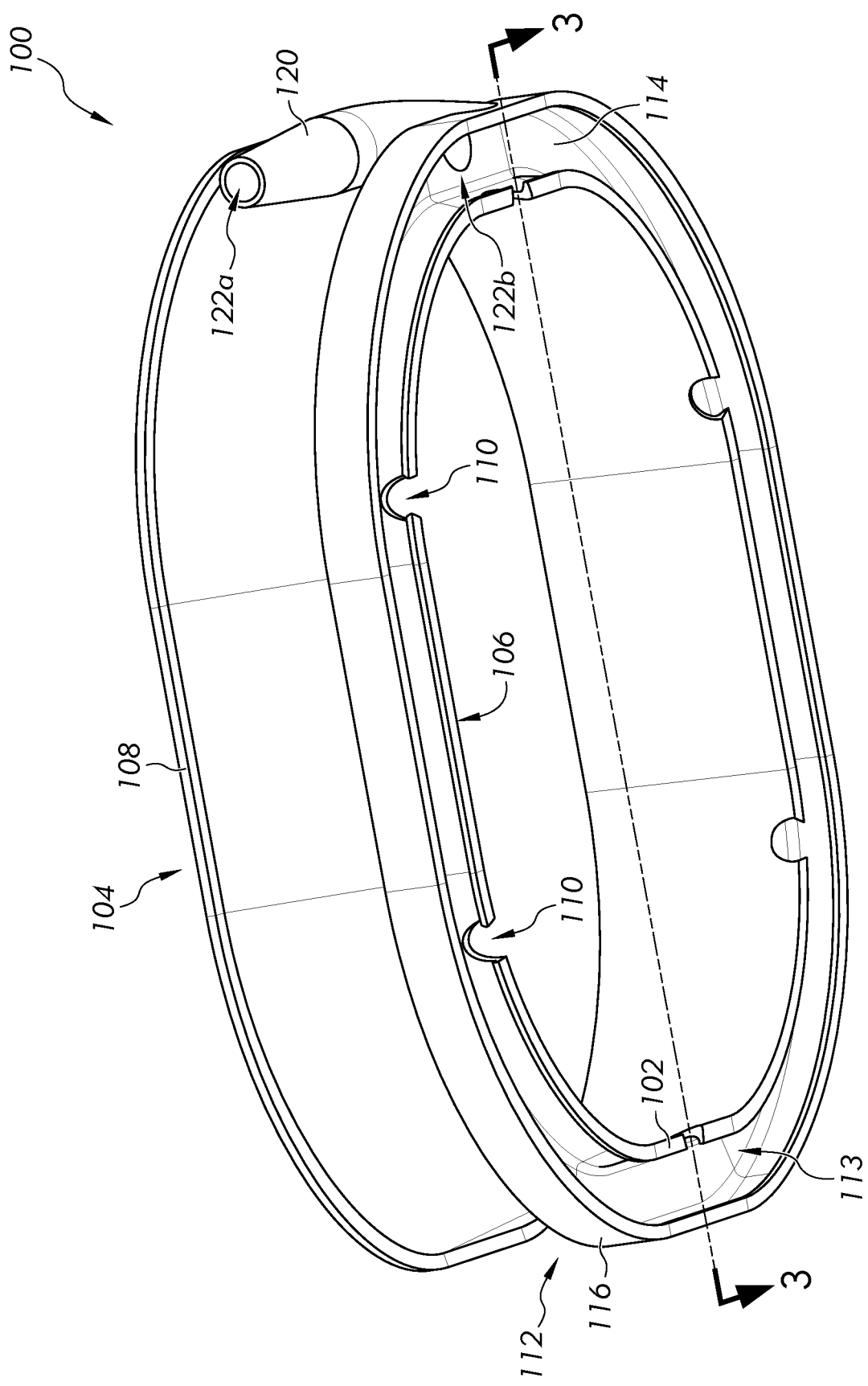
FIG. 2 is a bottom, perspective view of the spill protection basin shown in FIG. 1.

A plurality of suction ports 110 are provided in the wall 102 and at (i.e., adjacent to) the bottom end 106 thereof. The suction ports 110 are spaced, one from the other, about an inner surface of the wall 102. In the embodiment of FIG. 1, each suction port 110 is a notch formed completely through the wall 102 and extending from the bottom end 106 thereof. In the illustrated embodiment, the wall 102 has a total of six suction ports 110 at its bottom end 106 (e.g., as shown in FIG. 2). It is to be understood that any number of suction ports 110 can be provided. For example, the basin 100 can include only a single port.

The basin 100 further includes a base 112 adjacent to the bottom end 106 of the wall 102. The base 112 defines a suction channel 113 extending at least partially about a perimeter of the bottom end 106 of wall 102 in communication with the suction ports 110. In the illustrated embodiment the base 112 is a generally 'L' shaped element that projects peripherally outwards from the wall 102. Preferably, the base 112 is formed integral with the wall 102 (i.e., they are formed as a single common piece), however it is contemplated that the base 112 may be formed separate and distinct from the wall 102 and subsequently secured thereto. In the depicted embodiment, the base 112 extends about an entire outer periphery of the wall 102 adjacent its bottom end 106. However, it is contemplated that the base 112 can extend only partially about the outer periphery of the wall 102 (e.g., in one or multiple, discontinuous sections) if suction ports 110 are distributed about only selected portions of the wall 102. That is, the suction channel 113 need be distributed only about that/those portion(s) of the wall 102 where fluid may exit from a suction port 110.

In the instant embodiment, the L-shaped base 112 includes a collar 114 and a skirt 116, each circumscribing the wall 102. The collar 114 projects radially outwards from an outer surface of the wall 102, and the skirt 116 projects downwards from a distal perimeter end of the collar 114 relative to the central axis 'X.' In this manner, the collar 114 and the skirt 116 cooperate with the outer surface of the wall 102 at its bottom end to define the suction channel 113.

Figure 3:
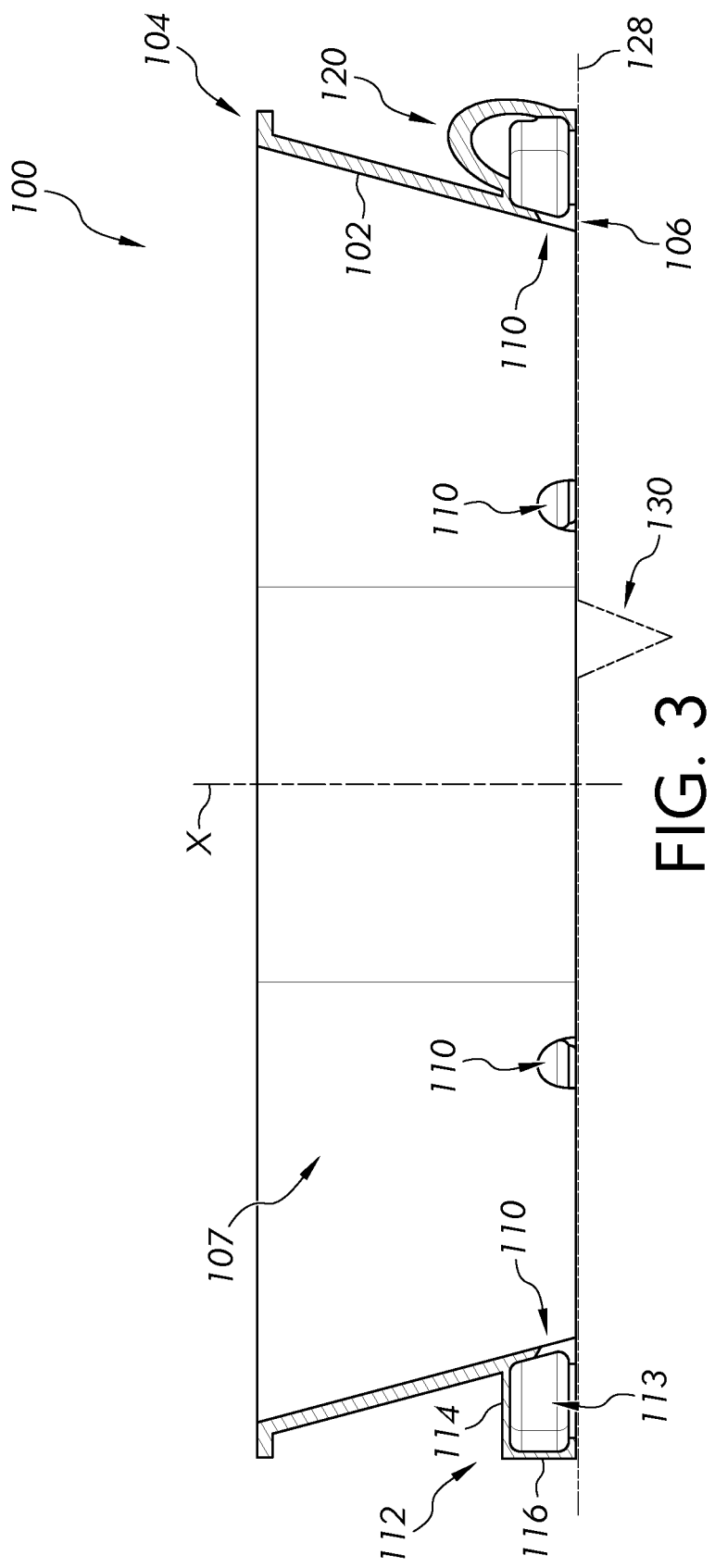
FIG. 3 is a cross-sectional view of the spill protection basin, taken along the line 3-3 shown in FIG. 1.

As seen in FIGS. 2 and 3, the suction channel 113 as-shown has an open bottom end. However, it is contemplated that the suction channel 113 can be partially closed at its bottom end. For example, the base 112 can include a bottom wall (not shown) having one or multiple apertures (i.e., through-holes) formed therethrough. The suction channel 113 is in fluid communication with the inner volume 107 of the basin 100 via the suction ports 110 formed in the wall 102.

As seen in FIGS. 1 and 2, a suction nozzle 120 is provided extending from the base 112, preferably formed integral therewith. With respect to FIG. 2, the suction nozzle 120 provides fluid communication between an outlet 122a thereof formed in its tip and an inlet 122b thereof that communicates with the suction channel 113. In the illustrated embodiment, the nozzle inlet 122b is an aperture formed in the collar 114 and/or the skirt 116 of the base 112 that defines the suction channel 113. As will be appreciated, the resulting structure provides a complete suction pathway for fluid that accumulates in the inner volume 107 of the basin 100, which can exit via the suction ports 110 and be drawn through the suction channel 113 and ultimately out via the nozzle 120 via a drainage system 124 connected therewith.

The suction nozzle 120 is configured to be fluidly connected to the drainage system 124, which includes a suction source and optionally may include a collection container to collect fluid drained from the basin 100 (e.g., to measure its volume or for later analysis). The nozzle 120 may be connected to the drainage system 124 via an intermediate tubing or conduit 126. While the suction nozzle 120 preferably is formed integral to the base 112, this need not be the case. Moreover, in certain instances a suction nozzle 120 may be omitted in favor of an alternative connection for supplying fluid communication between the suction channel 113 and the drainage system 124. For example, the tubing 126 may possess a fitting configured to mate with a complementary fitting disposed on the base 112 (not shown), to provide a reversible fluid connection. Such fittings may be conventional quick-connect fittings as known in the art, which permit a quick and removable connection to establish fluid communication.

During a surgical operation, a surgeon or operator places the basin 100 at a surgical site of the patient's skin 128 (see FIG. 3) such that the wall 102 surrounds an incision 130 or open wound being operated on. After the basin 100 is so positioned, it is pressed against the patient's skin 128 so that a substantially fluid-tight seal is formed between the bottom end 106 of the wall 102 of the basin 100 and the patient's skin 128 surrounding the surgical site. The strength of such seal need not be particularly robust, because fluid within the inner volume 107 of the basin 100 will not be at high pressure. However, it should be sufficient so that fluid is substantially prevented from escaping that volume 107 underneath the bottom end 106 of the wall 102. This can be achieved via an operator manually pressing the basin 100 against the patient's skin 128 during the surgical procedure. Alternatively, and preferably, it can be achieved via an adhesive or gasket disposed at the bottom end 106 of the wall 102, or via suction, as will be described below.

Once installed surrounding the surgical site, the operator connects the basin 100 to the drainage system 124 (e.g., by connecting tubing 126 to the nozzle 120). Then, with the suction source of the drainage system 124 active, fluid that collects within the basin 100 will be drawn via that suction through a suction pathway that proceeds from the inner volume 107, out via the suction ports 110, through the suction channel 113 and the nozzle 120, and ultimately into a collection container of the drainage system 124 or other disposal sink (e.g. a biohazard container) for safe disposal. In this manner the surgical field surrounding the surgical site at the center of the basin 100 will remain clear of excess, providing clearer and easier access for the operator and his/her tools. Moreover, that fluid will be evacuated via a substantially closed-pathway that inhibits spillage either onto the operators, or the operating table or floor.

In the embodiment of FIG. 1, the drainage system 124, when activated, can provide sufficient suction to not only draw fluid exiting via the suction ports 110, but also to secure the basin 100 to the patient's skin 128 at the bottom end of the suction channel 113. As shown in FIG. 3, when the basin 100 is seated at the surgical site (i.e., to the patient's skin 128), the suction channel 113 is enclosed at its bottom end via the patient's skin 128—which essentially forms a bottom wall of that channel 113. Accordingly, when the drainage system 124 is activated, its suction source can be operated to provide adequate suction to the channel 113 so that the vacuum generated therein will be sufficient to fix the basin 100 to the patient's skin 128, thereby providing a substantially fluid-tight seal that inhibits the passage of fluid from the inner volume 107 of the basin 100 past the wall 102 at its bottom end 106. As will be appreciated, in this embodiment and when operated in this manner, the level of suction from the drainage system 124 will need to be sufficient to sustain the described seal between the channel 113 and the patient's skin 128 despite the suction ports 110, which provide communication between that channel 113 and the ambient environment (e.g., the inner volume 107 of the basin 100). This can be achieved by tailoring the degree of suction in relation to the number and size of the suction ports 110.

In sum, the described embodiment of the basin 100 minimizes spilling of fluid during surgery. The basin 100 creates a boundary around the surgical site to entrap irrigation—and other surgical fluids within the inner volume 107 thereof, such that said fluid cannot readily spill outside of the inner volume 107. Moreover, the basin 100 prevents flooding of the surgical site and overflow of the fluid (e.g., onto the operating table and the floor) by drawing the fluid within the channel 113 (via the suction ports 110) and guiding said fluid to the drainage system 124 (e.g., its collection container).

In this embodiment, a single connection to a drainage system 124 is used to both generate sufficient vacuum within the suction channel 113 to affix the basin 100 to the patient's skin 128, and evacuate fluid from the inner volume 107 of the basin 100. As such, the operator is not required to manually hold the basin 100 against the patient's skin 128 to ensure a proper seal.

Figure 4:
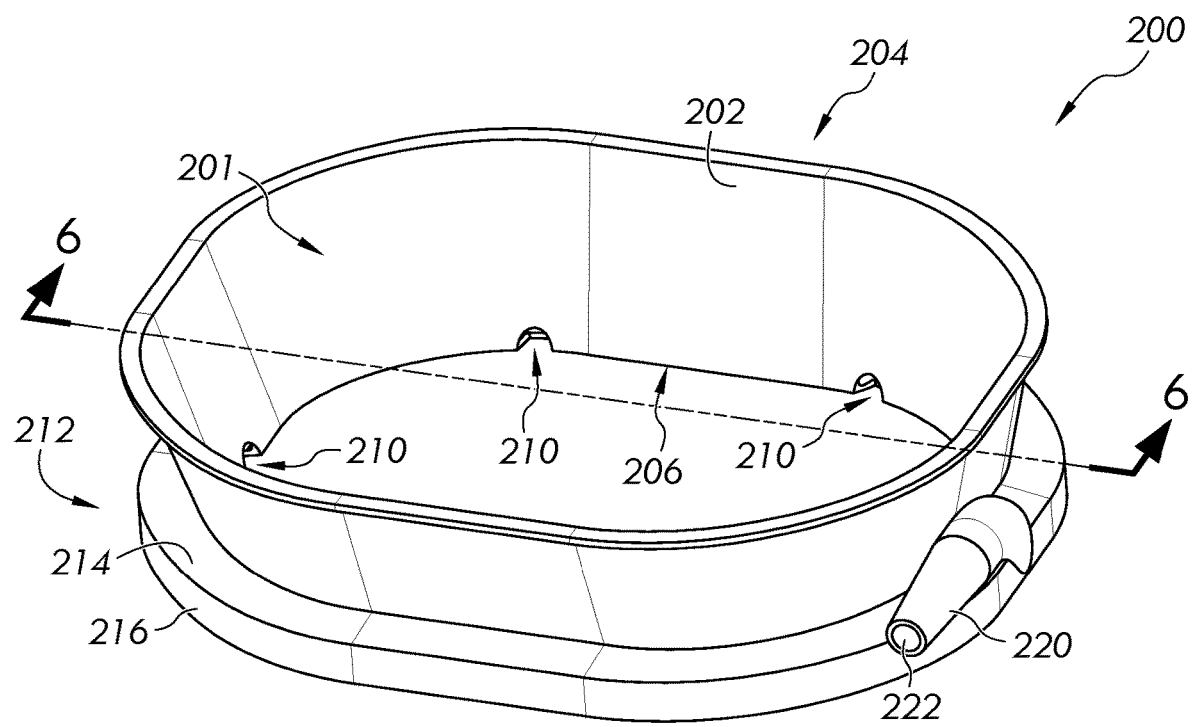
FIG. 4 is a top, perspective view of another embodiment of a spill protection basin.
Figure 5:
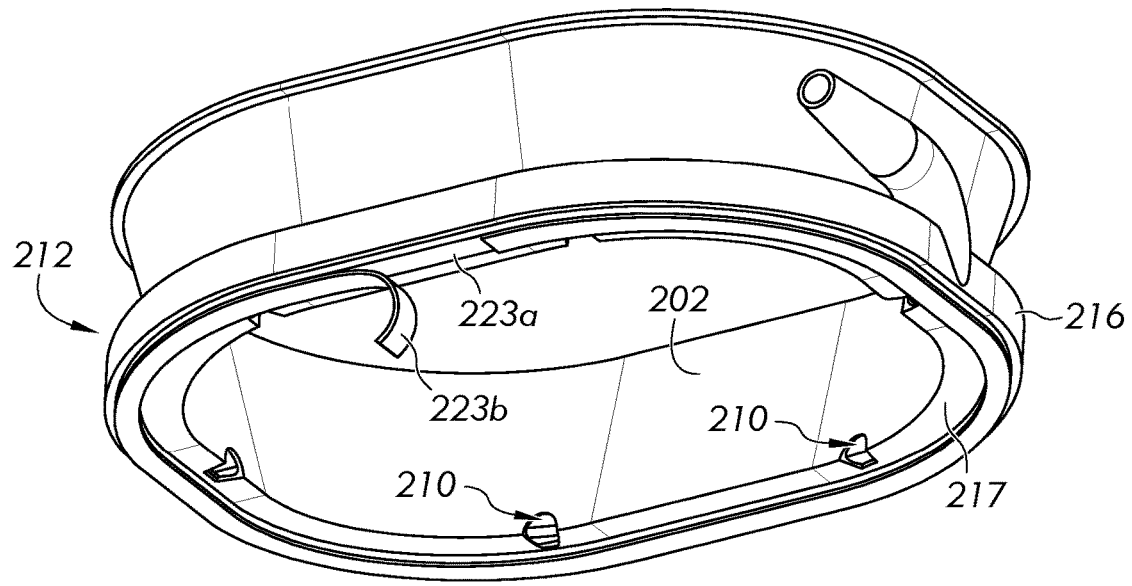
FIG. 5 is a bottom, perspective view of the spill protection basin shown in FIG. 4.
Figure 6:
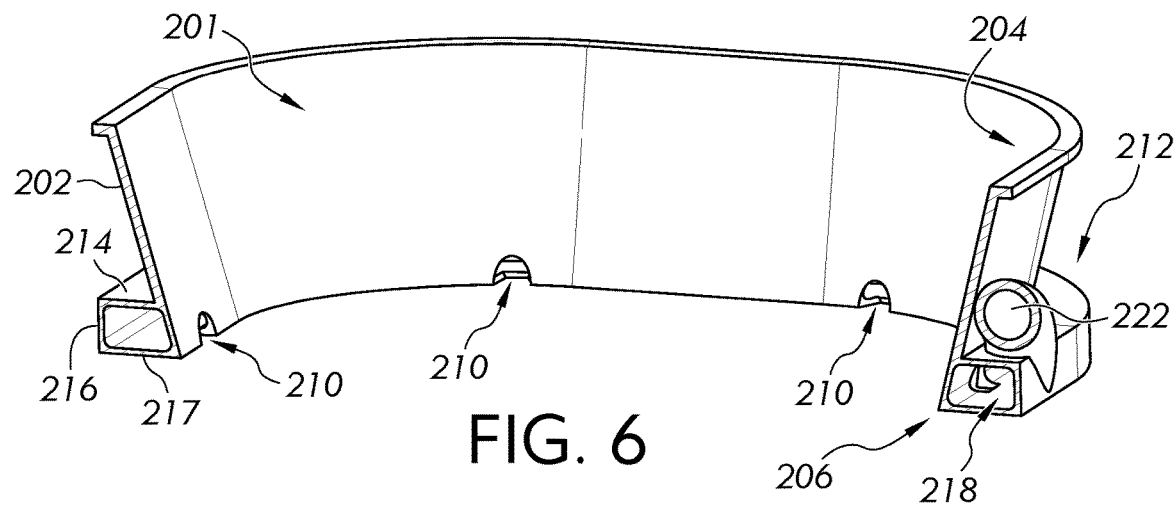
FIG. 6 is a cut-sectional view of the spill protection basin, taken along the line 6-6 shown in FIG. 4.

Moving on to FIGS. 4-6, another embodiment of a spill protection basin 200 is shown that defines an inner volume 201 therein. Similar to the basin 100 shown in FIG. 1, the basin 200 includes a perimeter wall 202 extending between top and bottom ends 204, 206. Further, a plurality of suction ports 210 are provided at the bottom end 206 of the wall 202 and are spaced, one from the other, about an inner periphery thereof. The basin 200 further includes a base 212 provided adjacent to and surrounding the bottom end 206 of the wall 202.

The base 212 as illustrated includes a collar 214 and a skirt 216, similarly as in the prior embodiment. However, here the base 212 further includes a bottom wall 217 extending (radially) between the perimeter wall 202 and the skirt 216. More specifically, the bottom wall 217 extends from a bottom edge of the skirt 216 to the bottom end 206 of the perimeter wall 202. In this manner, a suction channel 218 in this embodiment is defined within the base 212 between the perimeter wall 202, the collar 214, the skirt 216, and the bottom wall 217. That is, in this embodiment the bottom wall 217 of the suction channel 218 replaces the patient's skin as the lower bound thereof as compared to the prior embodiment. Notably, the suction ports 210 are formed as cooperating notches in both the perimeter wall 202 and the bottom wall 217. However, it is contemplated that the suction ports 210 may be formed without notches in the bottom wall 217. That is, the suction ports 210 can be formed by notches provided only in the perimeter wall 202.

The basin 200 similarly can includes a suction nozzle 220 in fluid communication with the suction channel 218, in order to provide a connection to a drainage system 124 as described above.

In operation, due to the addition of the bottom wall 217, the basin 200 cannot be fixed to the patient's skin via suction. Indeed, while the suction ports 210 may be partially formed in the bottom wall 217, those ports 210 also are open to the ambient environment via corresponding notches in the perimeter wall 202. Hence the ports 210 will not provide adequate suction against the skin to fix the basin 200 in place. Accordingly, during operation, to maintain an adequate seal against the passage of fluid past the bottom wall 217, other means can be used. For example, the operator can maintain a seal surrounding the surgical site by pressing the basin 200 manually against the patient's skin either throughout the procedure, or only when overflow fluid may emerge from the surgical incision or wound. However, in this embodiment it is preferred that a layer of skin-compatible pressure-sensitive adhesive (PSA) 223a is applied to the outer surface of bottom wall 217 (see FIG. 5). In this manner, the basin 200 can be affixed to the patient's skin about the surgical site via the adhesive 223a, which then will provide the desired fluid-tight seal against the skin until the basin 200 is removed. When supplied with PSA 223a applied to the bottom wall 217, optionally a release layer 223b (e.g. of silicone-coated paper) can be releasably applied to the PSA 223a. When the basin 200 is ready for use, the operator can remove and discard the release layer 223b, thus exposing the PSA 223a layer in preparation for affixation to the patient's skin. The particular PSA 223a used is not critical, so long as it is considered generally compatible for temporary affixation to human skin.

Thus, in the embodiment of FIGS. 4-6, when the basin 200 is fluidly connected to a drainage system 124 via its nozzle 220, the suction source is only used to draw fluid from the basin inner volume 201 via suction ports 210, and not to affix the basin 200 to the patient's skin.

Figure 7:
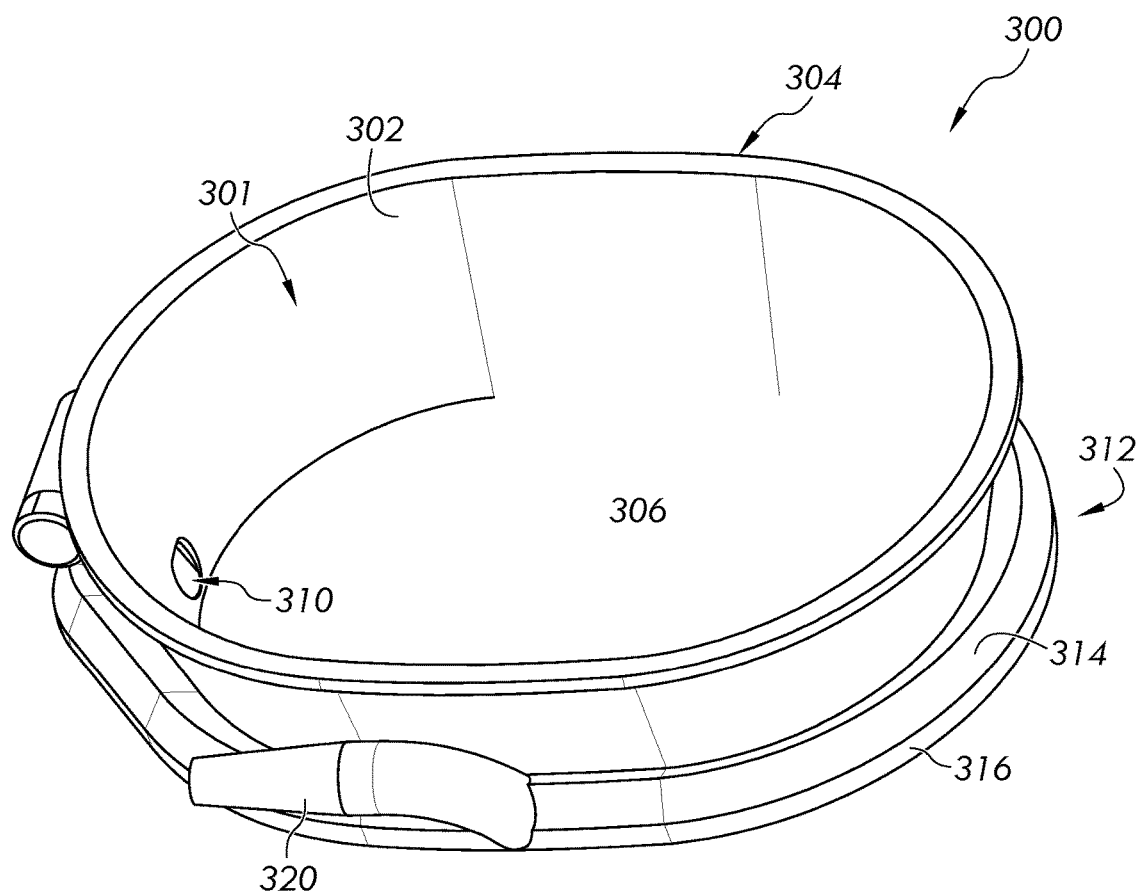
FIG. 7 is a top, perspective view of yet another embodiment of a spill protection basin.
Figure 8:
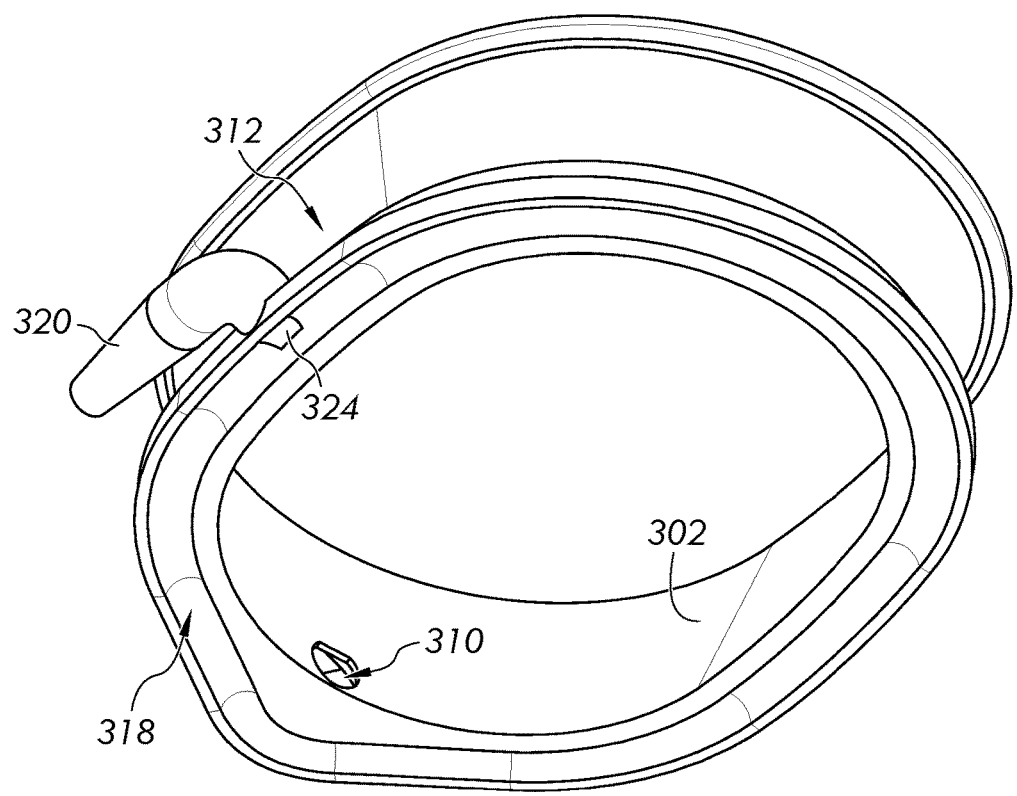
FIG. 8 is a bottom, perspective view of the spill protection basin shown in FIG. 7.
Figure 9:
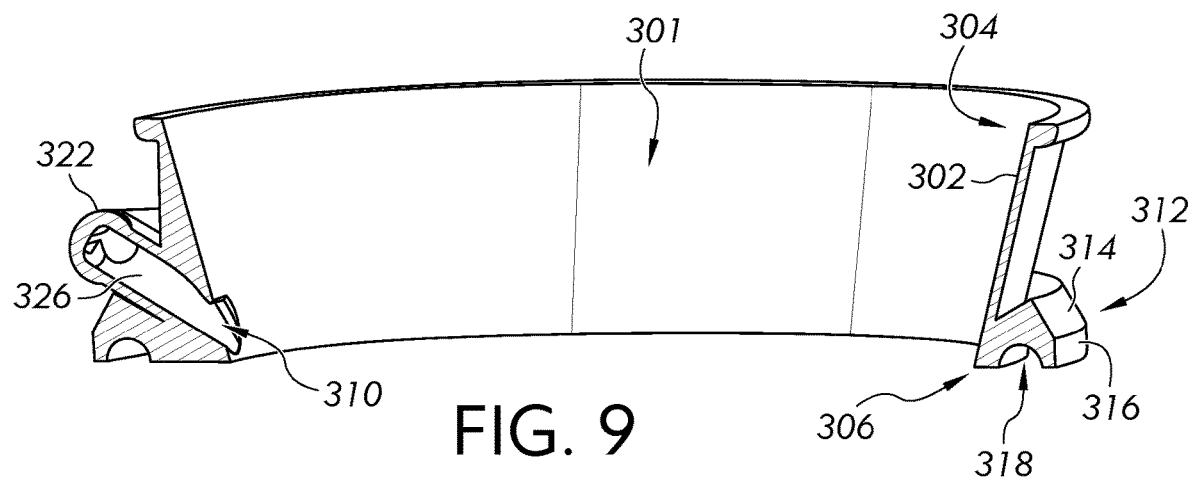
FIG. 9 is a cut-sectional view of the spill protection basin, taken along the line 9-9 shown in FIG. 7.

Referring now to FIGS. 7-9, another embodiment of a spill protection basin 300 is shown having an inner volume 301. Again, the basin 300 includes a perimeter wall 302 extending between top and bottom ends 304, 306. In this embodiment, the basin 300 includes only a single suction port 310 formed in the wall 302. The basin 300 further includes a base 312 adjacent to and surrounding the bottom end 306 of the wall 302. In particular, the base 312 includes a collar 314 and a skirt 316 similarly as in earlier embodiments, each circumscribing the wall 302. As shown in FIGS. 8 and 9, a channel 318 is defined within the base 312 surrounding the wall 302, and is open at its bottom end preferably along the entire perimeter of the base 312.

The basin 300 further includes first and second suction nozzles 320, 322, (best shown in FIG. 7) each of which generally being a hollow, tubular member. The first nozzle 320 extends from the base 312 and defines a first passage 324 therein (best shown in FIG. 8) that fluidly communicates with the channel 318. The second nozzle 322 extends from an outer surface of the wall 302 and defines a second passage 326 therein (best shown in FIG. 9) that fluidly communicates with the suction port 310, and thereby is in fluid communication with the inner volume 301 of the basin 300.

In operation, each of the first and the second nozzles 320, 322 is configured to be fluidly connected to a drainage system 124. Notably, the first and second nozzles 320, 322 can be connected to respective, independent drainage systems, or they can be connected to a common drainage system (e.g., via a tee fitting).

When the first nozzle 320 is connected to a drainage system 124, the suction source of the drainage system 124 draws suction on the first nozzle 320, and thereby on the channel 318 in the base 312. With the basin 300 positioned on a patient's skin around a surgical site, this results in suction being drawn against the patient's skin via the channel 318, thereby securing the basin 300 to the patient's skin. When the basin 300 is seated in this manner around the surgical site, the channel 318 is enclosed at its bottom end via the patient's skin, thereby effectively enclosing the channel 318 to maintain suction therein. Thus, the suction source provides adequate suction to the channel 318 (via the first passage 324 formed in the first nozzle 320) to fix the basin 300 to the patient's skin. Separately, the second nozzle 322 is connected to (the same or a different) drainage system 124, and suction also is applied against the suction port 310 to draw fluid from within the inner volume 301 of the basin 300 through the suction port 310, through the second passage 326 formed in the second nozzle 322, and out of the basin 300.

In sum, in this embodiment the basin 300 provides separate flow channels for affixing the basin 300 to the patient's skin and for drawing fluid from within the inner volume 301 of the basin 300 to maintain an unflooded surgical field. This is achieved via nozzles 320 and 322 communicating respectively (and via respective passages isolated from one another) with the suction port 310 and the suction channel 318. As noted, the first and second nozzles 320, 322 may be connected either to independent drainage systems or to a common drainage system.

Moving on to FIGS. 10A-12, a further embodiment of a spill protection basin 400 is shown having an inner volume 401 therein. Similar to the basin 100 shown in FIG. 1, the basin 400 includes a perimeter wall 402 extending between open, opposite top and bottom ends 404, 406. Further, a plurality of suction ports 410 are provided at the bottom end 406 of the wall 402 and are spaced about an inner periphery thereof. The basin 400 further includes base 412 surrounding and provided adjacent to the bottom end 406 of the wall 402.

Again, the base 412 includes a collar 414 and a skirt 416, each circumscribing the wall 402. As better shown in FIGS. 11-12, the collar 414 projects peripherally outwards from an outer surface of the wall 402, and the skirt 416 projects downwards from a perimeter edge of the collar 414. A partition wall 418 extends downward from an underside surface of the collar 414, thereby dividing the space defined within the base 412 into concentric first and second channels 420, 422 surrounding the perimeter wall 402 at its bottom end 406. Specifically, the first channel 420 is bounded by the collar 414, the perimeter wall 402, and the partition wall 418, and the second channel 422 is bounded by the collar 414, the partition wall 418, and the skirt 416. Notably, each of the first and the second channels 420, 422 can be open at their respective bottom ends. However, it is contemplated that at least the first channel 420 can be closed at its bottom end, thereby fully enclosing the first channel 420 within the base 412, while the second channel 422 retains an open bottom end in order to provide effective suction-based affixation to the patient's skin similarly as described for other embodiments. As further shown, the first channel 420 is provided in fluid communication with the inner volume 401 of the basin 400 via the suction ports 410, whereas the second channel 422 is fluidly isolated from the inner volume 401 (due to the partition wall 418). As used herein, two points or channels within a flow system of or associated with a basin are 'isolated' if, in normal usage as herein described, there is no fluid flow between those two points (or channels); i.e., no fluid flows from one of those points/channels to/into the other. However, fluid may flow from each of those isolated points/channels to a common downstream point (e.g., to a common nozzle or tee).

Figure 10A:
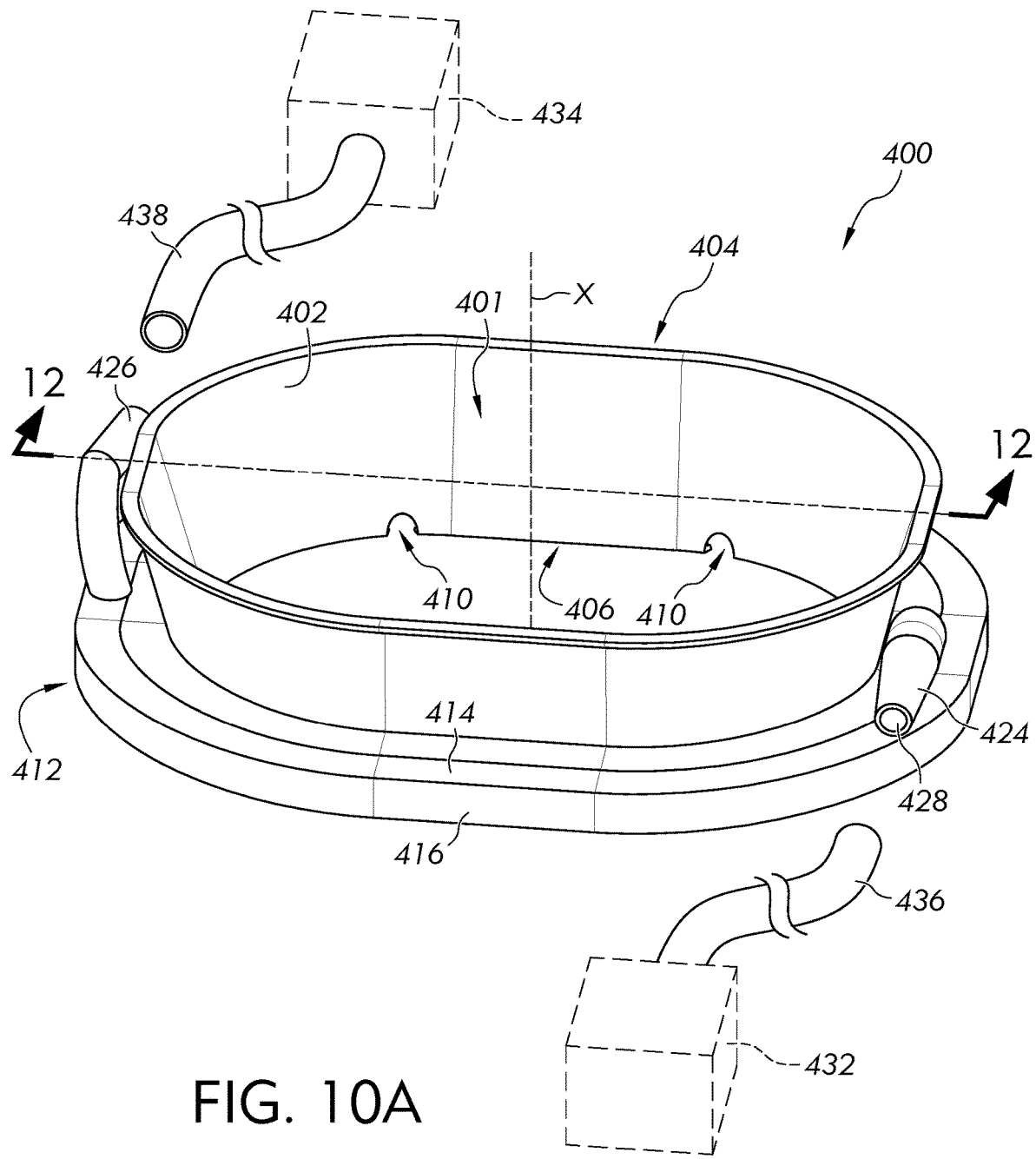
FIG. 10A is a top, perspective view of a further embodiment of a spill protection basin, used with two separate suction sources.

Referring to FIG. 10A, in this embodiment the basin 400 includes first and second nozzles 424, 426, each generally being a hollow, tubular member and extending outwards from the base 412 (e.g., from the collar 414). The first nozzle 424 defines a first passage 428 therein that communicates with the first channel 420 (shown in FIG. 11). Accordingly, the first passage 428 is provided in fluid communication with the inner volume 401 of the basin 400 via the first channel 420 and the suction ports 410. Similarly, the second nozzle 426 defines therein a second passage 430 that communicates with the second channel 422.

Figure 10B:
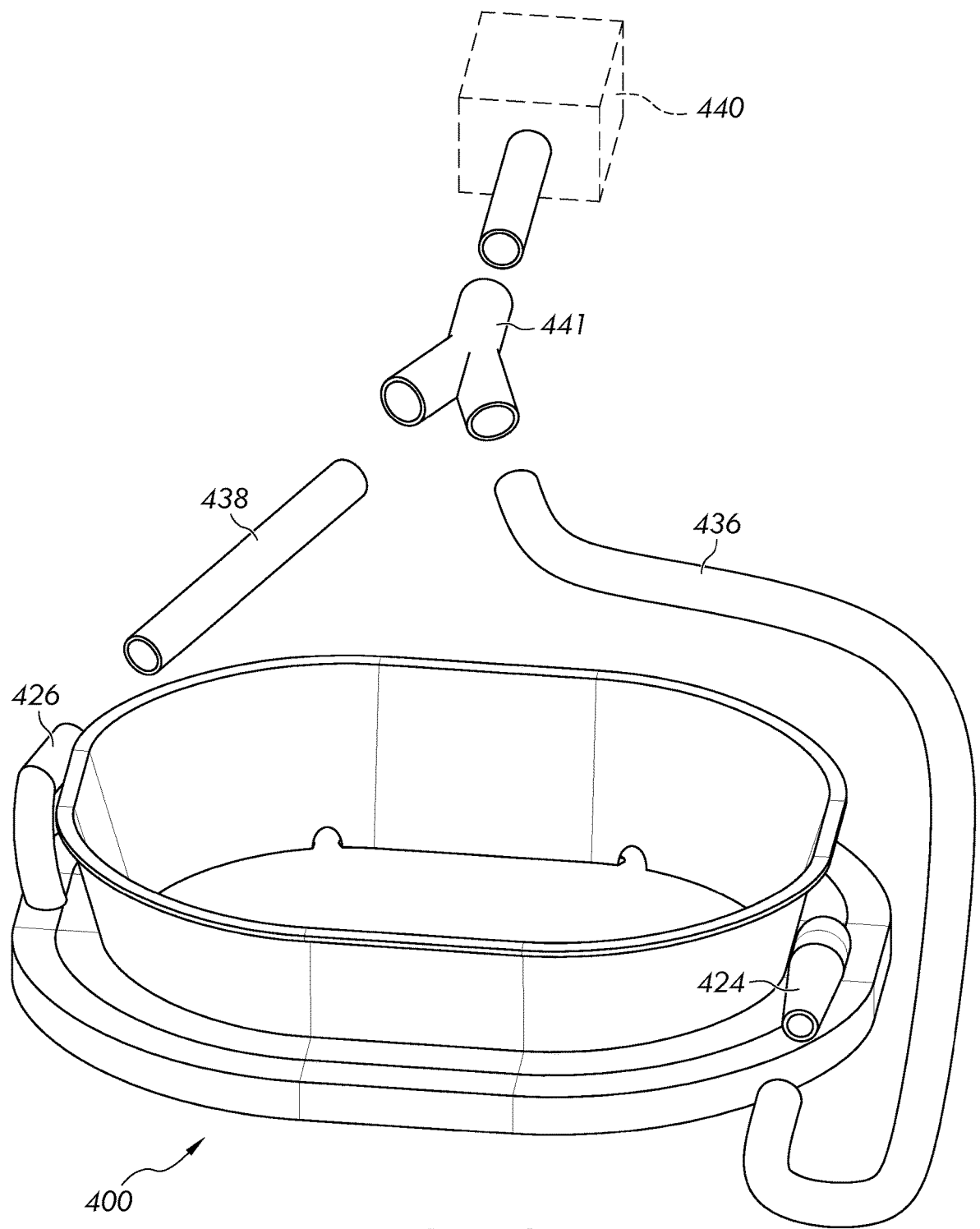
FIG. 10B depicts the spill protection basin shown in FIG. 10A used with a common suction source.
Figure 11:
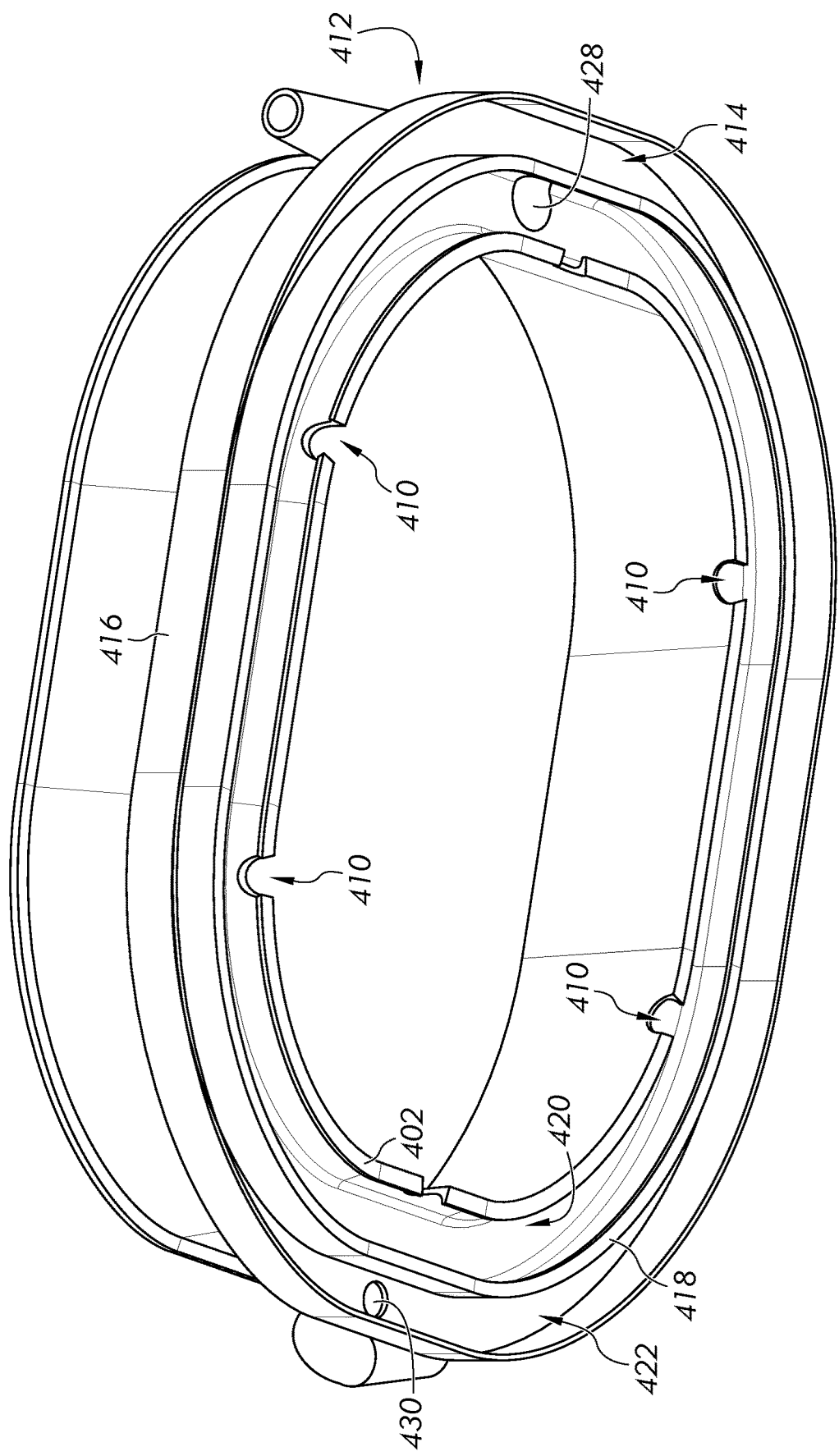
FIG. 11 is a bottom, perspective view of the spill protection basin shown in FIG. 10A.

Similar to the basin 300 described above, the first and the second nozzles 424, 426 of the basin 400 are configured to be fluidly connected to a drainage system; e.g., to a common drainage system or to separate drainage systems. For example, as seen in FIG. 10A the first and the second nozzles 424, 426 can be connected to respective, independent drainage systems 432, 434, via respective, independent tubes or conduits 436, 438. Alternatively, as seen in FIG. 10B the first and the second nozzles 424, 426 can be connected to a common drainage system 440; e.g., via their respective tubes/conduits 436, 438 and a common tee 441. In this manner, the first and the second nozzles 424, 426 are operably connected to a single, common drainage system 440.

In operation, during a surgical operation an operator places the basin 400 at a surgical site of a patient's skin 442 such that the perimeter wall 402 surrounds the surgical site; e.g., an incision 444 or open wound thereof. After the basin 400 is positioned at the intended surgical site, the operator connects the basin 400 to the drainage system(s) as described above. Similar to the embodiment of FIG. 1, the drainage system(s), when activated, provide(s) suction to secure the basin 400 to the patient's skin 442 via a vacuum drawn against the second channel 422, as well as to withdraw fluid from the inner volume 401 of the basin 400 via a vacuum drawn against the first channel 420 (and thereby the suction ports 410).

Figure 12:
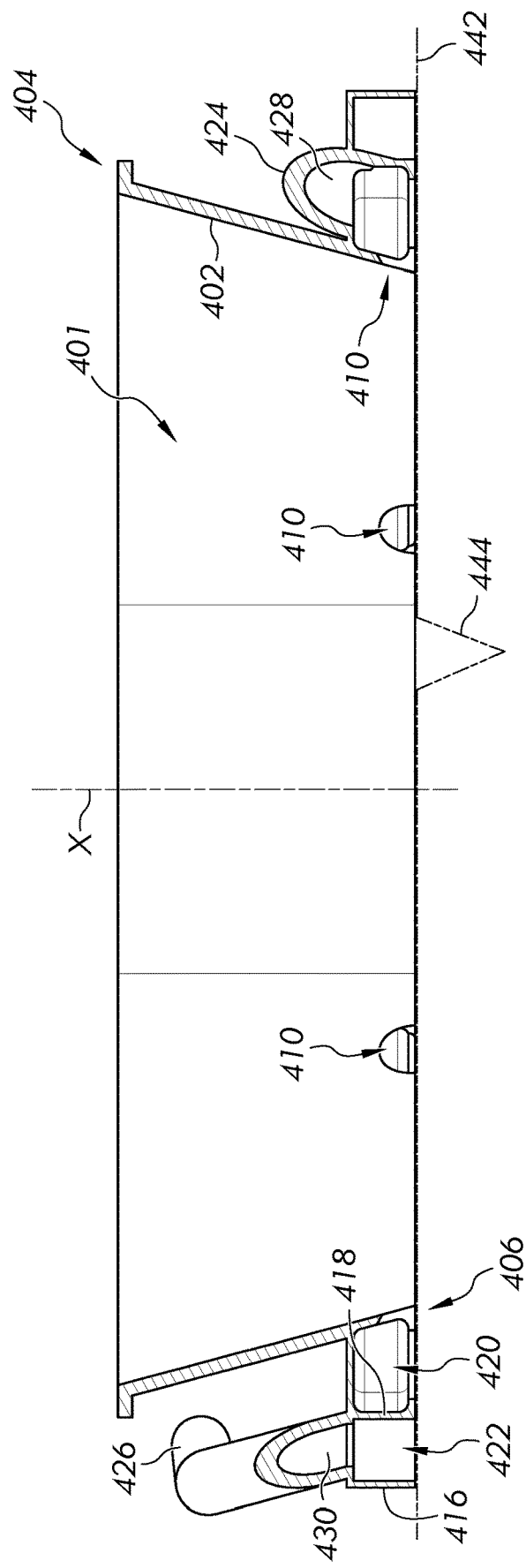
FIG. 12 is a cross-sectional view of the spill protection basin, taken along the line 12-12 shown in FIG. 10A.
Figure 13:
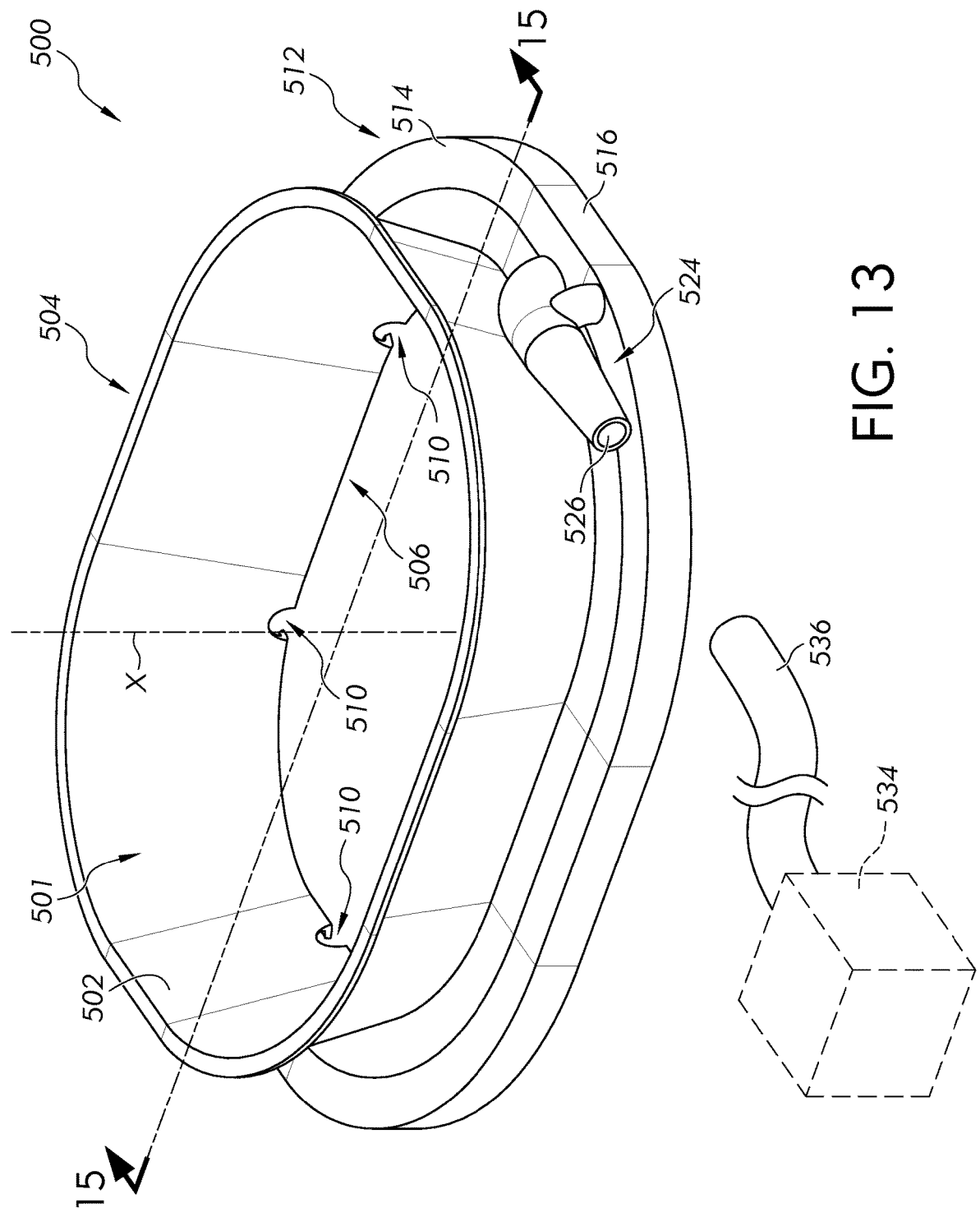
FIG. 13 is a top, perspective view of yet a further embodiment of a spill protection basin.

As shown in FIG. 12, when the basin 400 is correctly seated at the surgical site, both the first channel 420 and the second channel 422 are enclosed at their respective bottom ends, either via and against the patient's skin 442, or optionally wherein only the second channel 422 is open at its bottom end, and thus enclosed via/against the patient's skin 442. Accordingly, as in earlier embodiments, when the (associated) drainage system is activated, its suction source provides adequate suction to the second channel 422 to generate a vacuum therein, thereby fixing the basin 400 to the patient's skin 442. Additionally, the suction source of the drainage system connected to the first channel 420 draws fluid from the inner volume 401 of the basin 400 (i.e., via the suction ports 410 and the first channel 420).

In sum, similar to the basin 300 described above, the basin 400 provides separate (i.e., isolated) flow channels for affixing the basin 400 to the patient's skin 442 and for drawing fluid from the inner volume 401 of the basin 400.

FIGS. 13-16 illustrate yet a further embodiment of a spill protection basin 500 having an inner volume 501 therein. Similar to the basin 400 shown in FIG. 10A, the basin 500 includes a perimeter wall 502 extending between open, opposite top and bottom ends 506, 508. Further, a plurality of suction ports 510 are provided at the bottom end 506 of the wall 502 and are spaced about an inner periphery thereof. The basin 500 further includes a base 512 surrounding and disposed adjacent to the bottom end 506 of the wall 502.

Figure 14:
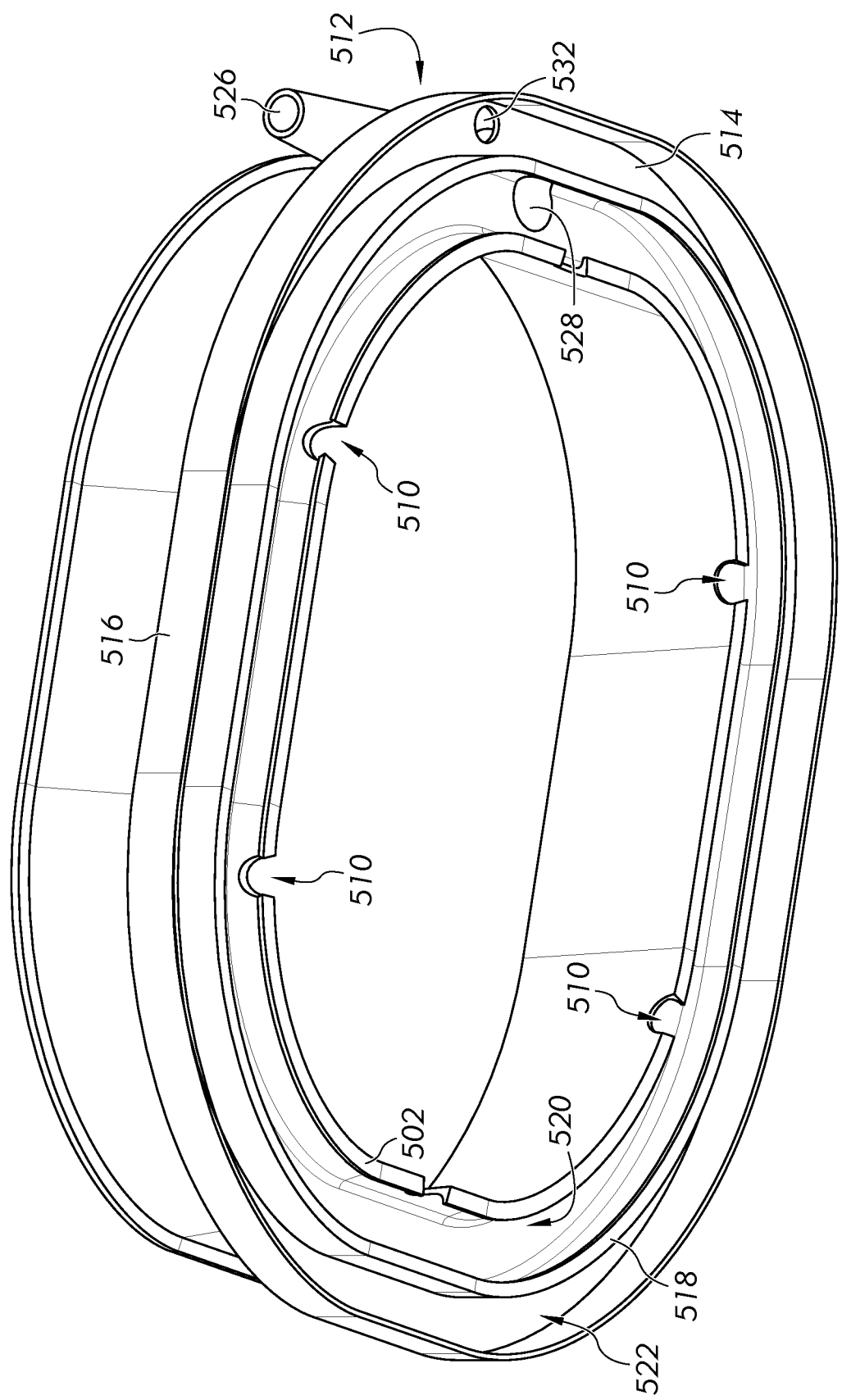
FIG. 14 is a bottom, perspective view of the spill protection basin shown in FIG. 13.
Figure 15:
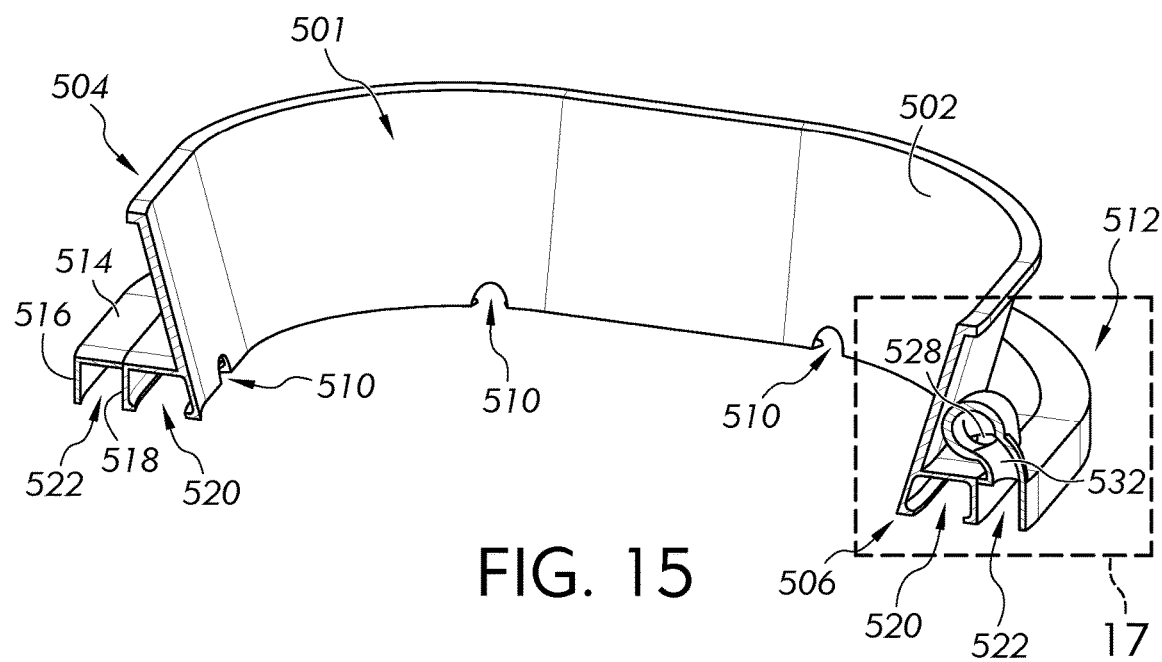
FIG. 15 is a cut-sectional view of the spill protection basin, taken along the line 15-15 shown in FIG. 13.
Figure 16:
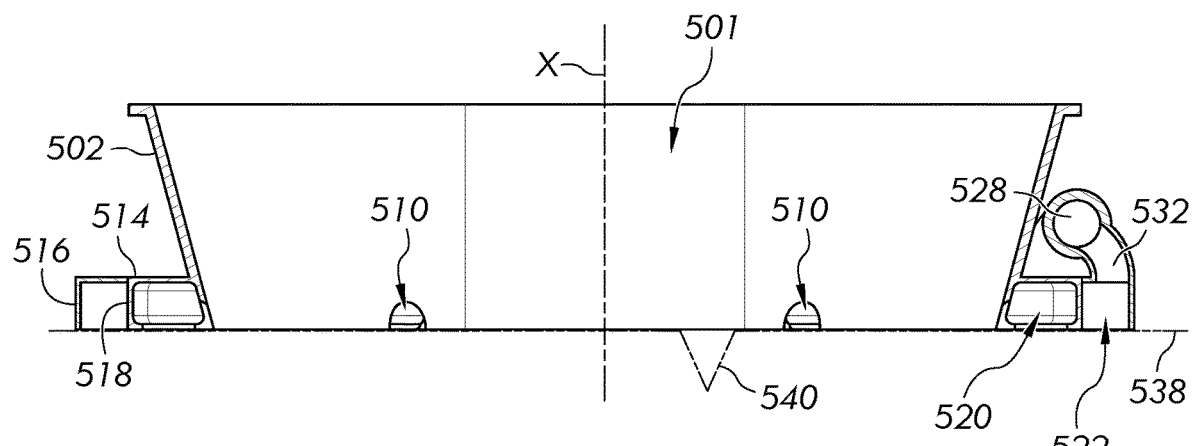
FIG. 16 is a cross-sectional view of the spill protection basin, taken along the line 15-15 shown in FIG. 13.

Again, the base 512 includes a collar 514 and a skirt 516, each circumscribing the wall 502. As best seen in FIGS. 14-16, the collar 514 projects peripherally outwards from an outer surface of the wall 502, and the skirt 516 projects downward from a peripheral edge of the collar 514. The base 512 also includes a partition wall 518 extending downward from an underside surface of the collar 514 thereby dividing the space defined within the base 512 into concentric first and second channels 520 and 522 surrounding the perimeter wall 502 at its bottom end 506. The first and second channels 520 and 522 here are similar to the first and second channels 420 and 422 of the preceding embodiment.

Figure 17:
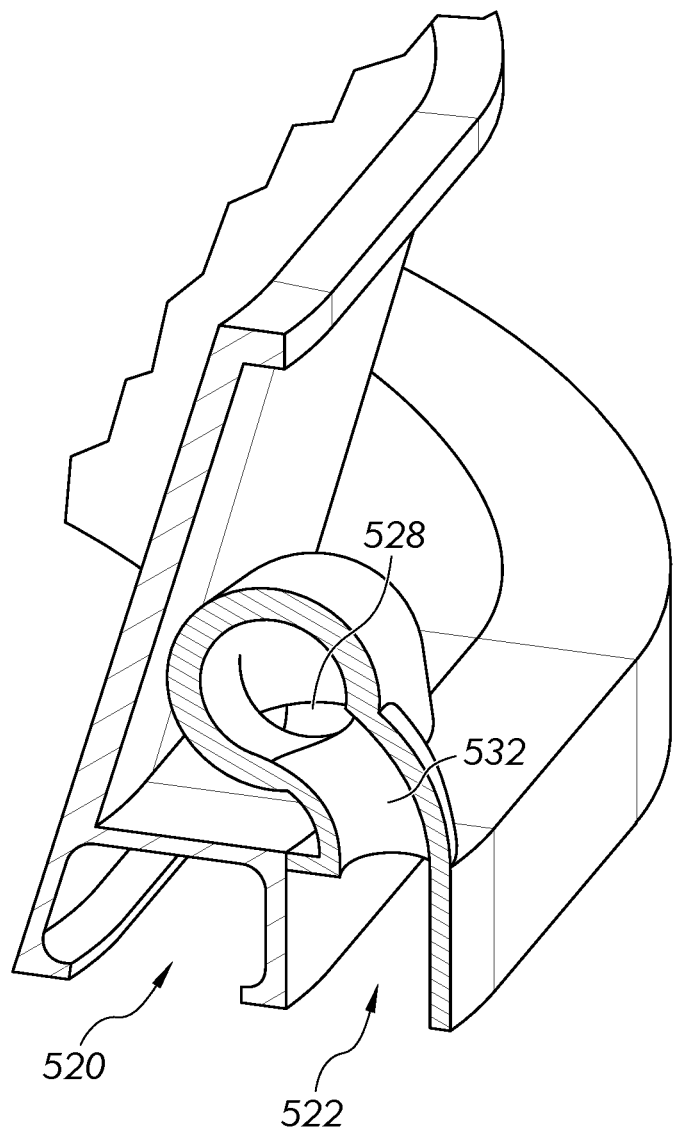
FIG. 17 is an enlarged view of area '17' depicted in FIG. 15.

However, unlike in the prior embodiment, here the basin 500 includes only a single nozzle 524 extending from the base 512, which is in communication with both of the first and second channels 520 and 522 via a tee integrated into basin 500; e.g., in the nozzle 524, or in the base 512 between those channels 520,522 and the nozzle 524. In the illustrated embodiment, the tee is effectively integrated into the nozzle 524, which includes a first conduit 528 extending from and communicating with the first channel 520, and a second conduit 532 extending from and communicating with the second channel 522, wherein the first and second conduits 528 and 532 converge to a discharge conduit 526 of the nozzle 524, which can be connected to tubing 536 leading to a suction source 534 of a drainage system. The first and second conduits 528 and 532 are best seen in FIG. 17.

In this embodiment, and similar to the basin 100 described above, the nozzle 524 of the basin 500 is configured to be fluidly connected to a single drainage system 534, which provides suction both to affix the basin 500 in-place on a patient's skin 538 and to draw fluid from the inner volume 501 thereof via suction ports 510. However, unlike in the first embodiment (i.e., basin 100), here affixation to the patient's skin 538 and drawing fluid from the inner volume 501 are achieved via separate channels 520, 522 that are isolated from one another, and which communicate with a common single nozzle 524 downstream via an integrated tee. Otherwise, use of the basin 500 of this embodiment proceeds similarly as for the first embodiment (basin 100) discussed above).

As shown in FIG. 16, optionally when the basin 500 is seated at the surgical site, both the first channel 520 and the second channel 522 are enclosed at their respective bottom ends via the patient's skin 538. Alternatively, the first channel 520 (communicating with suction ports 510) may include a bottom wall that closes that channel at its bottom end, wherein only the second channel 522 is open to the patient's skin 538, such that suction drawn thereon will be drawn against the skin 538 to affix the basin 500 in-place.

In this embodiment, the basin 500 provides separate flow channels within the base 512 for affixing the basin 500 to the patient's skin 538 and for drawing fluid from the inner volume 501 of the basin 500. However, the first and second channels 520, 522 receive suction from the common drainage system 534 via the single nozzle 524.

Figure 18:
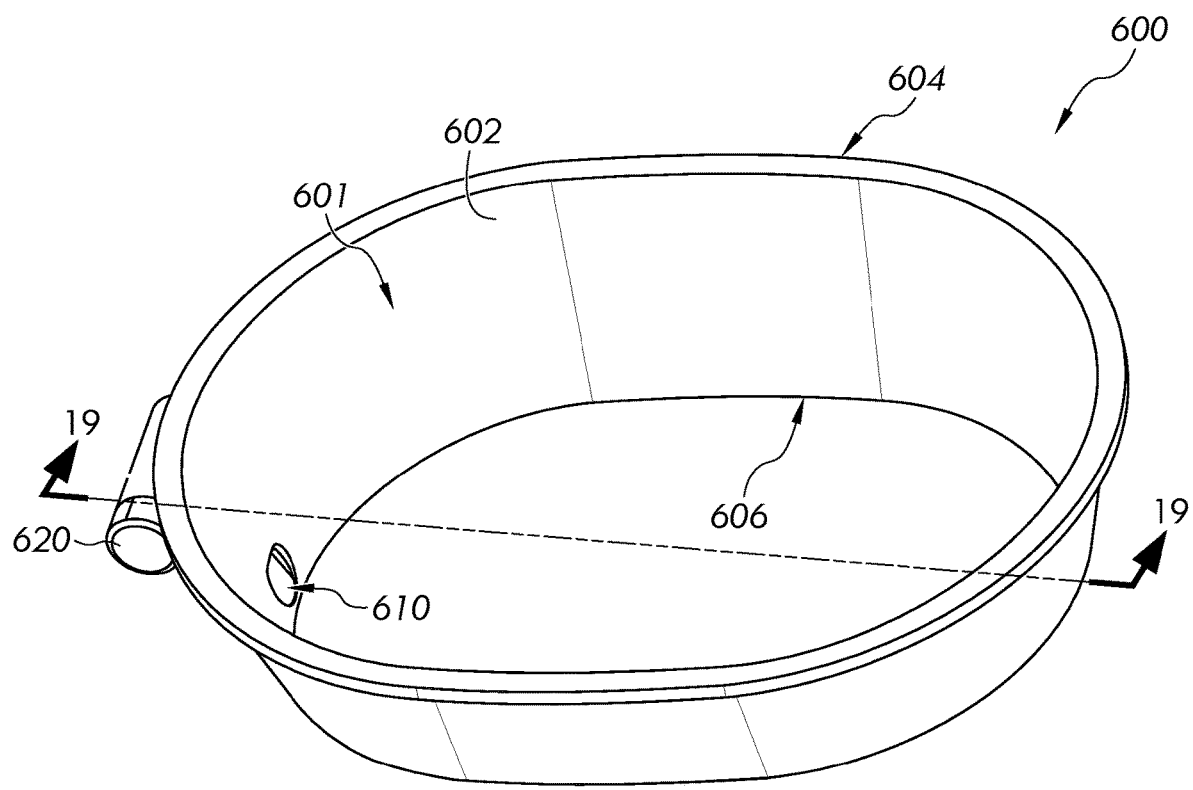
FIG. 18 is top, perspective view of yet another embodiment of a spill protection basin.
Figure 19:
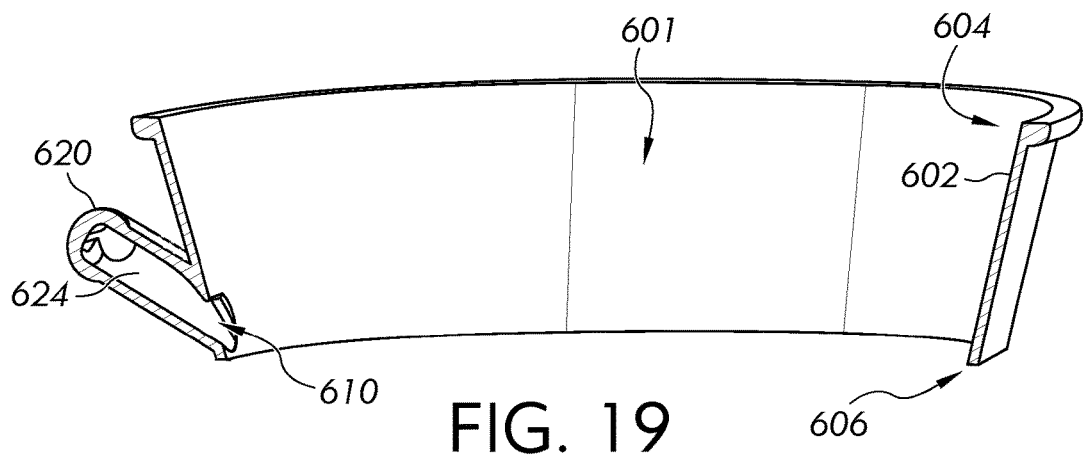
FIG. 19 is a cut-sectional view of the spill protection basin, taken along the line 19-19 shown in FIG. 18.

Regarding FIGS. 18-19, yet another embodiment of a spill protection basin 600 is shown having an inner volume 601. Again, the basin 600 includes a perimeter wall 602 extending between top and bottom ends 604, 606. Further, the basin 600 includes only a single suction port 610 formed in the wall 602. The suction port 610 is in fluid communication with an internal passage 624 of a suction nozzle 620 (e.g., a hollow, tubular member). In this embodiment, the basin 600 has no base defining a suction channel surrounding the wall 602. As such, the suction nozzle 620 extends directly from (e.g., formed with or connected to) an external surface of the wall 602. Here, when the suction port 610 is in fluid communication with a suction source (via the internal passage 624 of the suction nozzle 620) fluid is drawn from the inner volume 601 of the basin 600 to maintain a clear field.

Each of the aforementioned embodiments of the spill protection basin creates a boundary around a surgical site to contain fluid that overflows the surgical incision or wound within an inner volume thereof, which can be efficiently drained to maintain a clear field. As such, fluid will not spill beyond the surgical field, over the patient, the operating-table or the floor (and potentially the operator). Moreover, the perimeter wall in each embodiment includes at least one suction port in fluid communication with a suction source in order to draw the fluid from within the inner volume in order to maintain a clear field. Further still, the basin can be secured around the surgical site via suction provided by the same, common suction source, or via an independent suction source as that used to drain fluid. Such securement can be provided via a vacuum generated in a channel formed adjacent to and surrounding a bottom end of the perimeter wall, thus alleviating the necessity for an operator to hold the basin at the correct position and to maintain downward pressure to ensure a reliable seal.

The invention has been described with reference to example embodiments. Modifications and alterations thereto will be evident to persons of skill in the art upon a reading and understanding this specification. Examples embodiments incorporating one or more aspects of the invention are intended to include all such modifications and alterations insofar as they come within the scope of the appended claims.

What is claimed is:

1. A spill protection basin adapted to surround an open-wound surgical site of a patient and to prevent spilling of overflow irrigation fluid therefrom, the basin comprising:
    a perimeter wall having a thickness and defining an inner volume;
    a plurality of suction ports formed in the perimeter wall adjacent to a bottom end thereof, the plurality of suction ports configured to permit drawing fluid radially outward from said inner volume when suction is applied thereto;
    a first channel in communication with the plurality of suction ports, the first channel being located outside the perimeter wall and entirely outside the inner volume; and
    a second channel having an open bottom end that is configured to be closed by a surface surrounding the surgical site when the basin rests thereon, said second channel being further configured to have a suction applied thereto to thereby secure the basin to the surface and form a seal therewith.

2. The basin of claim 1, further comprising a first suction nozzle in communication with the first channel, wherein the first channel is configured to receive the fluid from the plurality of suction ports when suction is applied thereto.

3. The basin of claim 2, said first channel being disposed adjacent to, projecting outwards from, and surrounding the bottom end of said perimeter wall.

4. The basin of claim 3, wherein said second channel is disposed adjacent to said first channel, and wherein said first and second channels are isolated from one another.

5. The basin of claim 4, further comprising a second suction nozzle in communication with the second channel, wherein a vacuum is generated within the second channel when suction is applied thereto via the second suction nozzle so as to secure the basin to said surface and form a seal therewith.

6. The basin of claim 4, said first suction nozzle also being in communication with said second channel such that a suction applied to the first suction nozzle draws a vacuum against both said first channel and said second channel.

7. The basin of claim 6, said first and second channels communicating with said first suction nozzle via a tee integrated into said basin.

8. The basin of claim 7, said tee being integrated with said first suction nozzle.

9. The basin of claim 1, said plurality of suction ports being isolated from said second channel.

10. A spill protection basin adapted to surround an open-wound surgical site on the skin of a patient and to prevent spilling overflow irrigation fluid therefrom, the basin comprising:
  a perimeter wall defining an inner volume;
  a plurality of suction ports formed in the perimeter wall adjacent to a bottom end thereof, the plurality of suction ports configured to permit drawing fluid from said inner volume when suction is applied thereto;
  a first channel in communication with the plurality of suction ports and located entirely outside the perimeter wall; and
  a first suction nozzle in communication with the first channel,
  wherein the first channel has an open bottom end that is configured to be closed by a surface surrounding the surgical site when the basin rests on said surface, and wherein a vacuum is generated within the first channel when suction is applied thereto via said first suction nozzle so as to secure the basin to said surface and form a seal therewith.

11. The basin of claim 10, said surface being a skin surface of the patient.

12. A method for preventing spilling overflow of irrigation fluid from an open-wound surgical site of a patient, comprising:
  positioning a basin around the open-wound surgical site, the basin comprising:
    a perimeter wall having a thickness and defining an inner volume for containing the overflow of irrigation fluid, and
    a first channel located outside the perimeter wall and located entirely outside the inner volume, said first channel having an open bottom end, wherein the basin is positioned such that the perimeter wall and the first channel surround the open-wound surgical site, wherein the basin is positioned so that said open bottom end of the first channel is closed by a skin surface of the patient surrounding said surgical site, and wherein the perimeter wall comprises a plurality of suction ports formed at a bottom end thereof and in communication with the first channel; and
  applying suction to the plurality of suction ports to draw fluid radially outward from said inner volume through said plurality of suction ports and into the first channel, and wherein said suction generates a vacuum within the first channel so as to secure the basin to the skin surface and form a seal therewith.

13. The method of claim 12, the basin further comprising a second channel disposed adjacent to said first channel, the second channel having an open bottom end, wherein the basin is positioned so that said open bottom end of the second channel is closed by a surface of the patient surrounding said surgical site, wherein said suction is applied both to said first channel to draw said fluid from the inner volume of the basin through said plurality of suction ports, and to said second channel to generate a vacuum therein so as to secure the basin to the surface and form a seal therewith.

14. The method of claim 13, the basin further comprising first and second suction nozzles in fluid communication with the first and second channels, respectively, wherein said suction is applied separately to each of the first and second suction nozzles.

15. The method of claim 13, the basin further comprising a suction nozzle in fluid communication with both of the first and second channels, wherein said suction is applied to both of the first and second channels via the suction nozzle.

16. A spill protection basin adapted to surround an open-wound surgical site of a patient to prevent spilling overflow irrigation fluid therefrom, the basin comprising:
  a perimeter wall defining an inner volume whose cross-sectional area narrows downwardly towards a bottom end thereof;
  a plurality of suction ports formed in the perimeter wall adjacent to the bottom end thereof, the plurality of suction ports configured to permit drawing fluid from said inner volume when suction is applied thereto;
  a first channel in communication with the plurality of suction ports and continuously surrounding an outer surface of the bottom end of said perimeter wall; and
  a second channel disposed adjacent to said first channel and having an open bottom end configured to be closed by a surface surrounding the surgical site when the basin is positioned on that surface,
  wherein a suction drawn against each of the first and second channels will be effective to draw fluid through the plurality of suction ports into the first channel and to generate a vacuum within the second channel so as to secure the basin to the surface and form a seal therewith.

17. The basin of claim 16, further comprising a suction nozzle in fluid communication with both said first channel and said second channel such that said suction can be applied to both the first and second channels via the suction nozzle.

18. The basin of claim 16, wherein the plurality of suction ports are spaced from one another around said perimeter wall at the bottom end thereof, each of the plurality of suction ports being in communication with the first channel so that said suction applied against said first channel will be effective to draw fluid from the inner volume of the basin through each of the plurality of suction ports.

19. The basin of claim 10, wherein the first channel has an inverted U-shaped cross-section, and wherein said inverted U-shaped cross-section with the open bottom end of the first channel extends about the bottom end of said perimeter wall.

* * * * *